E. KNOCK.
Coupling for Thrashing-Machines.

No. 163,083. Patented May 11, 1875.

WITNESSES:

INVENTOR:
E. Knock
BY
ATTORNEYS.

UNITED STATES PATENT OFFICE

EDWIN KNOCK, OF VERMONT, ILLINOIS.

IMPROVEMENT IN COUPLINGS FOR THRASHING-MACHINES.

Specification forming part of Letters Patent No. 163,083, dated May 11, 1875; application filed April 17, 1875.

*To all whom it may concern:*

Be it known that I, EDWIN KNOCK, of Vermont, Fulton county, Illinois, have invented a new and useful Improvement in Couplings, of which the following is a specification:

This invention relates to a new and useful improvement in couplings for thrashing-machines, and for other purposes; and consists in balls in combination with the clevis-shank of the coupling, confined in the coupling, as hereinafter more fully described.

Figure 1:
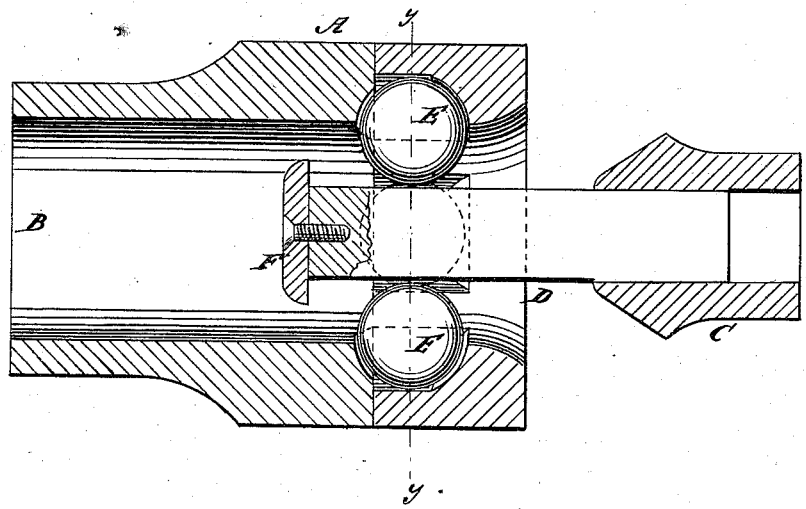
Figure 2:
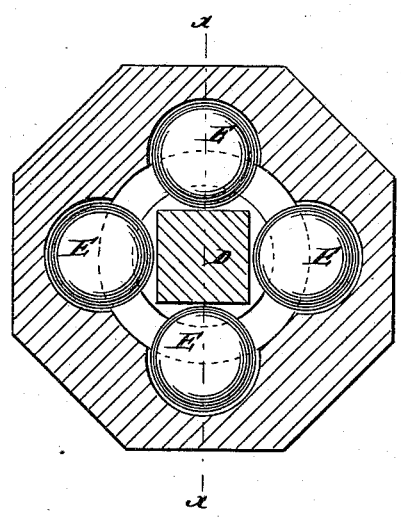

Figure 1 is a section of Fig. 2, taken on the line $x\,x$; and Fig. 2 is a vertical section of Fig. 1, taken on the line $y\,y$.

Similar letters of reference indicate corresponding parts.

A is the coupling, the aperture B of which may be made of any size. C is the clevis, and D the clevis-shank. E represents the balls. There are four of these balls, placed in separate cells of hemispherical form, and so loosely placed that they can readily and freely revolve in all directions. These four balls are placed so that the shank of the coupling-clevis D is inserted between them, substantially as seen in the drawing. F is a cap on the end of the shank.

In this example of my invention the shank is square, but it may be triangular, or of other form, and less than four balls may be employed, if desired.

The coupling-rods of thrashing-machines are usually placed at such an angle that the friction is very great, and the couplings soon wear out. There is necessarily considerable lateral motion in the old style of couplings when they are used on a level plane. The advantage of my improved coupling over the old style is that it works with as little friction at an angle as when used on a level. The bend or obtuse angles formed do not affect the action at all, there being no bolts or rods to create friction, while the coupling is much cheaper and simpler than the couplings in common use.

A joint of the most perfect and simple form is thus produced, which is essentially anti-friction in its operation.

Having thus described my invention, I claim as new and desire to secure by Letters Patent—

1. A coupling having balls therein, between which balls the clevis-shank is confined, substantially as shown and described.

2. A joint consisting of a socket-piece, a bar surrounded by balls, substantially as shown and described.

EDWIN KNOCK.

Witnesses:
WILLIAM J. MOORE,
G. W. DEWEY.